(12) United States Patent
Igarashi et al.

(10) Patent No.: US 8,919,634 B2
(45) Date of Patent: Dec. 30, 2014

(54) SOLDER BALL PRINTING APPARATUS AND SOLDER BALL PRINTING METHOD

(71) Applicant: Hitachi, Ltd., Toyko (JP)

(72) Inventors: Akio Igarashi, Tokyo (JP); Hirokuni Kurihara, Tokyo (JP); Ryosuke Mizutori, Toyko (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/191,642

(22) Filed: Feb. 27, 2014

(65) Prior Publication Data

US 2014/0263589 A1    Sep. 18, 2014

(30) Foreign Application Priority Data

Mar. 14, 2013  (JP) ................................. 2013-051692

(51) Int. Cl.
 *B23K 31/02* (2006.01)
 *B23K 37/00* (2006.01)
 *B23K 3/06* (2006.01)
 *B23K 1/20* (2006.01)

(52) U.S. Cl.
 CPC ................. *B23K 3/0623* (2013.01); *B23K 1/20* (2013.01)
 USPC ............. 228/245; 228/41; 228/49.1; 228/246

(58) Field of Classification Search
 None
 See application file for complete search history.

(56) References Cited

U.S. PATENT DOCUMENTS

| 6,276,599 | B1 * | 8/2001 | Ogawa | 228/254 |
|---|---|---|---|---|
| 2002/0178943 | A1 * | 12/2002 | Takahashi et al. | 101/129 |
| 2006/0219755 | A1 * | 10/2006 | Kajii | 228/39 |
| 2009/0001132 | A1 | 1/2009 | Aoya | |
| 2009/0057372 | A1 * | 3/2009 | Niizuma et al. | 228/9 |
| 2009/0072011 | A1 * | 3/2009 | Sakaguchi et al. | 228/245 |
| 2009/0120996 | A1 * | 5/2009 | Kitamura | 228/41 |
| 2009/0307899 | A1 * | 12/2009 | Nebashi et al. | 29/739 |
| 2010/0044413 | A1 * | 2/2010 | Kajii | 228/41 |
| 2010/0051673 | A1 * | 3/2010 | Zakel et al. | 228/245 |
| 2010/0127049 | A1 * | 5/2010 | Ishikawa et al. | 228/248.1 |
| 2010/0270357 | A1 * | 10/2010 | Honma et al. | 228/9 |
| 2010/0270364 | A1 * | 10/2010 | Sakaguchi et al. | 228/246 |
| 2010/0272884 | A1 * | 10/2010 | Igarashi et al. | 427/126.1 |
| 2010/0291289 | A1 * | 11/2010 | Kim | 427/98.4 |
| 2011/0249113 | A1 * | 10/2011 | Koyanagi | 348/95 |
| 2011/0277556 | A1 * | 11/2011 | Peecock et al. | 73/827 |

(Continued)

FOREIGN PATENT DOCUMENTS

| JP | 2001-160674 A | * | 6/2001 |
|---|---|---|---|
| JP | 2005-166908 A | * | 6/2005 |
| JP | 2007-088344 A | * | 4/2007 |
| JP | 2008-004775 A | * | 1/2008 |

(Continued)

*Primary Examiner* — Kiley Stoner
(74) *Attorney, Agent, or Firm* — Antonelli, Terry, Stout & Kraus, LLP.

(57) ABSTRACT

A solder ball printing apparatus fills plural openings formed in a mask with solder balls using a squeegee and prints the solder balls on plural electrode portions formed on a surface of a substrate facing the mask. The solder ball printing apparatus includes: a substrate mounting table on which the substrate is mounted and on the back surface side of which plural hole portions are formed; a print table on which the substrate mounting table is mounted; an XYθ stage which can drive the print table in a horizontal plane; a print table cylinder which can vertically drive the print table; a mask absorption portion which has members that can be fitted into the substrate mounting table; and a mask absorption cylinder which can vertically drive the mask absorption portion.

6 Claims, 9 Drawing Sheets

(56) References Cited

U.S. PATENT DOCUMENTS

2012/0104076 A1* 5/2012 Suga et al. ............... 228/180.22
2012/0244666 A1* 9/2012 Mukai et al. ................ 438/126
2013/0020379 A1* 1/2013 Kim ............................ 228/256
2014/0001241 A1* 1/2014 Igarashi et al. .................. 228/9

FOREIGN PATENT DOCUMENTS

| JP | 2008-192818 A | 8/2008 |
| JP | 2012-19000 A | 1/2012 |
| KR | 101086376 B1 * | 11/2011 |

* cited by examiner

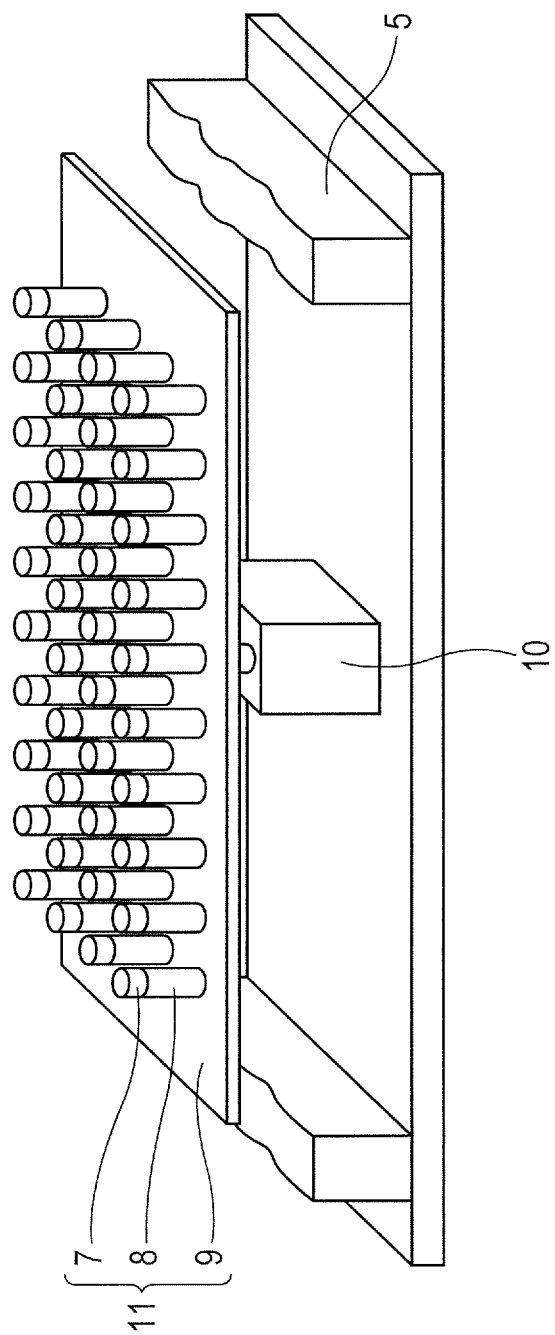

SOLDER BALL PRINTING APPARATUS AND SOLDER BALL PRINTING METHOD

The present application claims priority from Japanese Patent Application No. 2013-051692 filed on Mar. 14, 2013, the content of which is hereby incorporated by reference into this application.

BACKGROUND OF THE INVENTION

1. Field of the Invention

The present invention relates to a solder ball printing apparatus and a solder ball printing method in which solder balls are printed on electrodes formed on a surface of a substrate.

2. Description of the Related Art

In the case where solder balls are disposed on a mask to fill opening portions of the mask with the solder balls in a conventional solder ball printing apparatus, the magnetic mask is fixed while keeping a gap between the mask and a substrate constant. Therefore, protruding posts are provided on the back surface of the mask, and magnets are provided on the table side across the substrate.

An example of such a solder ball printing apparatus is disclosed in Japanese Patent Application Laid-Open No. 2008-192818. In order to accurately and reliably mount conductive balls on terminal areas of a substrate, the device described in Japanese Patent Application Laid-Open No. 2008-192818 has a backup plate on which the substrate is mounted to release the terminal areas, and a metal mask. Further, the device includes a feeding mask in which plural through-holes corresponding to the plural terminal areas of the substrate are formed, a fixing block that fixes the ends of the feeding mask so that the feeding mask faces one surface of the substrate, and magnets that attract the feeding mask to the backup plate side with a magnetic force. In addition, the attraction force of the magnets is smaller in the middle portion of the feeding mask than in the peripheral portion.

Another example of a conventional solder ball printing apparatus is disclosed in Japanese Patent Application Laid-Open No. 2012-19000. In the solder paste printing apparatus described in Japanese Patent Application Laid-Open No. 2012-19000, highly-accurate printing is performed to prevent solder paste from entering between a substrate and a mask even if solder paste for fine pitches is used. Therefore, a mask is allowed to come into contact with the upper surface of a substrate held on a stage, and solder paste is put on the mask, so that a squeegee is moved along the upper surface of the mask. In addition, magnetic material is used for the mask, and an electromagnet is provided on the stage to absorb the mask through the substrate.

As is known in the art, the magnets are disposed on the table to absorb the mask, and the mask is attracted to the substrate side across the substrate by the attraction force of the magnets to allow the mask and the substrate to adhere tightly to each other. However, the thickness of the mask is usually as thin as 20 μm to 100 μm. Thus, it is necessary to make the magnets closer to the mask within a few mm to reliably absorb the mask to the substrate, and the material of a substrate reception plate to support the substrate needs to be configured using a thin plate. If the substrate reception plate is made thinner, the substrate and the substrate reception plate are likely to be absorbed to the mask due to warpage, and thus it is difficult to keep the flatness.

On the other hand, predetermined tension is added to the mask to keep the accuracy of the mask. Therefore, if the mask is absorbed by the magnets disposed on the table, it is difficult to allow the mask and the substrate to completely adhere tightly to each other. If the substrate and the mask do not completely adhere tightly to each other, one hole of the mask on which a predetermined hole pattern is formed is filled with two or more balls in some cases when filling the substrate with the balls through the pattern holes of the mask, although each hole is supposed to be filled with one ball. This is a phenomenon called "double ball" or "extra ball" in which a pad on a substrate is filled with extra balls.

Further, when the mask is separated from the substrate, the mask is swiftly separated from the outer periphery portion of the substrate while being bent because the substrate is separated from the mask while keeping the magnetic force. Therefore, the balls mounted on the substrate with difficulty are moved from predetermined positions, and a phenomenon called "shift ball" in which balls are shifted from regular mounting positions occurs. Further, when the mask is swiftly separated, the balls mounted on the substrate are flicked, and the balls disadvantageously adhere to and remain on the side faces of the pattern holes of the mask.

When the mask is absorbed to the substrate by the magnetic force of the magnets attracting the mask, the micro-ball mounting apparatus described in Japanese Patent Application Laid-Open No. 2008-192818 realizes uniform absorption by making the absorption force smaller in the middle portion than in the peripheral portion. However, although the apparatus has a relative difference of the absorption force, the mask is always absorbed, and thus the following troubles are likely to occur. Specifically, when the mask is separated from the substrate after the solder balls are completely mounted on one substrate, the mask is separated while making the absorption force in the middle portion smaller, in other words, while always providing the force of absorbing the mask when viewed from the substrate side. Thus, the bending of the mask is not eliminated on the whole surface. Therefore, under the circumstance in which the outer diameter of solder balls is reduced every year, it is difficult to stably mount the solder balls.

Further, in Japanese Patent Application Laid-Open No. 2012-19000, the electromagnet is embedded on the table to absorb the mask and the substrate. However, if the electromagnet is used, it is necessary to attach plural electromagnets. In addition, a control device provided with a demagnetization function is needed because the magnetic force remains even when the supply of current to the electromagnets is stopped. Further, the electromagnets release heat to the outside due to heat generation, and thus a cooling function is necessary to avoid deformation of the table due to the heat. In addition, the structure of the table becomes complicated and the cost thereof is increased.

BRIEF SUMMARY OF THE INVENTION

The present invention has been made in view of the above-described problems of the prior art, and an object thereof is to provide a solder ball printing apparatus that reliably and accurately mounts solder balls on a pad on a substrate without positional shifts of the solder balls while keeping the flatness of the substrate and while accurately maintaining a gap between a mask and the substrate. Another object of the present invention is to prevent positional shifts of the solder balls by eliminating the magnetic force at the time of plate separation.

According to an aspect of the present invention to achieve the above-described objects, provided is a solder ball printing apparatus that fills plural openings formed in a mask with solder balls using a squeegee and mounts the solder balls on plural electrode portions formed on a surface of a substrate facing the mask, the machine including: a substrate mounting table on which the substrate is mounted and on the back surface side of which plural hole portions are formed; an XYθ stage which can drive a table on which the substrate mounting table is mounted in a horizontal plane; first vertically-driving means that can vertically drive the table on which the substrate mounting table is mounted; a mask absorption portion which has members including permanent magnets fitted into the plural hole portions formed in the back surface of the substrate mounting table; and second vertically-driving means which can vertically drive the mask absorption portion and is provided under the substrate mounting table, wherein the first vertically-driving means and the second vertically-driving means can be driven independently from each other.

In the aspect, the members that are provided in the mask absorption portion and can be fitted into the plural hole portions of the substrate mounting table may have plural column-like objects obtained by combining column-like permanent magnets extending in the vertical direction with column-like magnetic members that are adsorbed to the column-like permanent magnets and extend in the vertical direction, and a plate to which the plural column-like objects are absorbed. The members that are provided in the mask absorption portion and can be fitted into the plural hole portions of the substrate mounting table have bar-like permanent magnets extending in the lateral direction and magnetic bars that are disposed on the back surface side of the permanent magnets and are absorbed to the permanent magnets, and the plural hole portions formed in the substrate mounting table may be substantially-parallel plural grooves.

Further, in the above-described aspect, it is desirable that the members that are provided in the mask absorption portion and can be fitted into the plural hole portions of the substrate mounting table have permanent magnets located on the substrate side and magnetic members located on the side opposite to the substrate, and are installed to hold the positions of the magnets and magnetic pins using only absorption by the magnetic force of the permanent magnets. It is preferable that the second vertically-driving means that drives the mask absorption portion that can be driven independently from the vertical movement of a substrate print table allows the members that are provided in the mask absorption portion and can be fitted into the plural hole portions to be fitted into the hole portions formed in the back surface of the substrate mounting table at the uppermost ascent position of the mask absorption portion, and a mask absorption portion lower-end stopper is provided to prevent the members that can be fitted into the plural hole portions from getting out of the hole portions of the substrate mounting table at the lowermost descent position of the mask absorption portion.

According to another aspect of the present invention to achieve the above-described objects, provided is a solder ball printing method in which plural openings formed in a mask are filled with solder balls using a squeegee and the solder balls are mounted on plural electrode portions formed on a surface of a substrate facing the mask, wherein: a substrate mounting table on which the substrate is mounted is lifted using first vertically-driving means that drives the substrate mounting table; the substrate and the mask are positioned using an XYx table; combined members of permanent magnets and magnetic bodies that are fitted into hole portions formed on the back surface side of the substrate mounting table and are provided in a mask absorption portion are lifted using second vertically-driving means in the hole portions; and the mask and the substrate are absorbed by the permanent magnets.

According to the present invention, the solder ball printing apparatus allows the plural combined members of the permanent magnets and the magnetic members to be fitted into the hole portions on the back surface side of the substrate mounting table on which the substrate is mounted, and the members can be moved up and down by means that is different from substrate mounting table driving means. Thus, the solder balls can be reliably and accurately mounted on a pad (electrode portion) on the substrate without positional shifts of the solder balls while keeping the flatness of the substrate and while accurately maintaining a gap between the mask and the substrate. Further, positional shifts of the solder balls can be prevented by eliminating the magnetic force at the time of plate separation.

BRIEF DESCRIPTION OF THE SEVERAL VIEWS OF THE DRAWING

FIG. 8 is a perspective view of the mask absorption portion provided in the solder ball printing apparatus shown in FIG. 1.

DETAILED DESCRIPTION OF THE INVENTION

In a solder ball printing apparatus that prints solder balls on a pad (electrode portion) on a substrate, the pitch of a print target tends to be shortened to as small as 150 μm or smaller. Along with the shortened pitch, solder balls having a size as small as φ20 to φ100 μm are used. Accordingly, an apparatus that can reliably print even small solder balls with a high degree of accuracy is needed. The present invention relates to a solder ball printing apparatus adapted to minute pitches, and some embodiments of the solder ball printing apparatus according to the present invention will be described below using the drawings.

Figure 1:
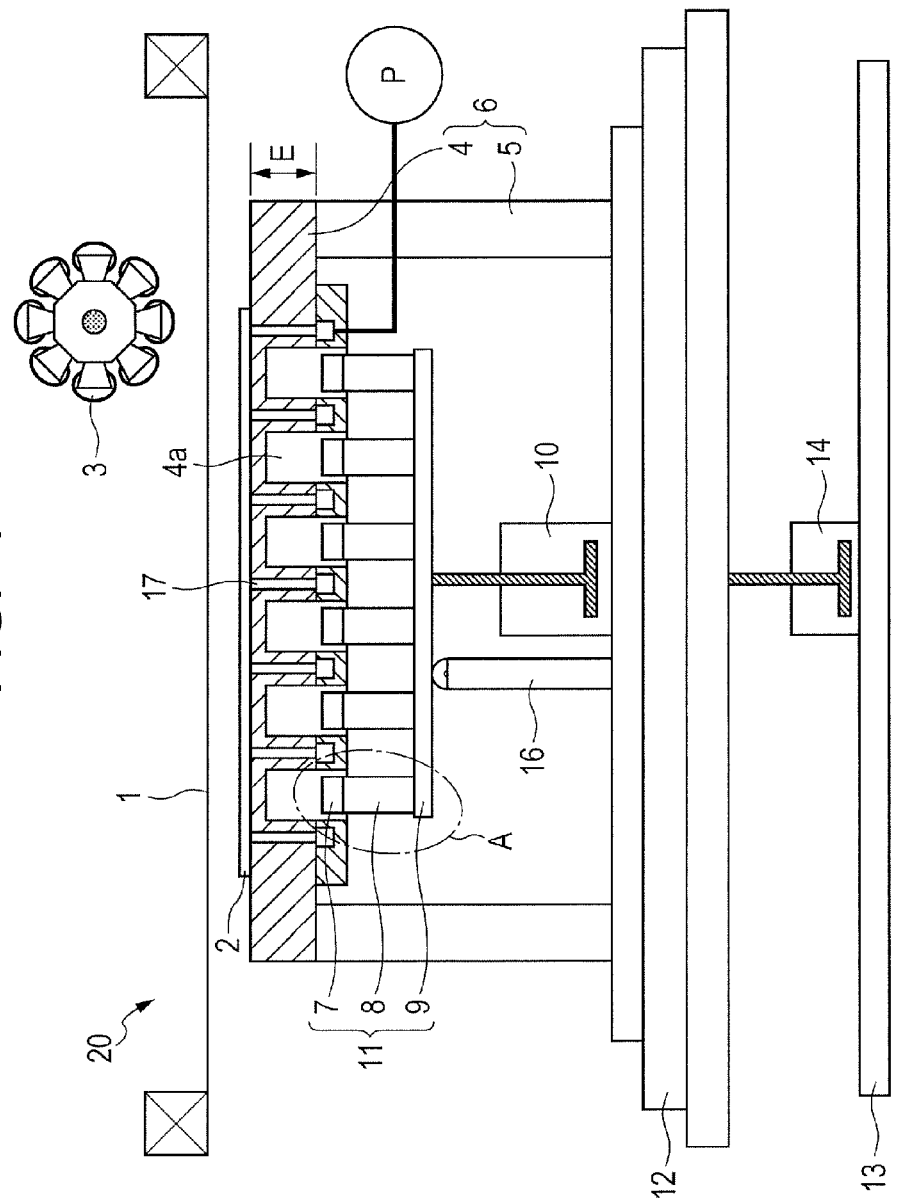
FIG. 1 is a front view of one embodiment of a solder ball printing apparatus according to the present invention.
Figure 2:
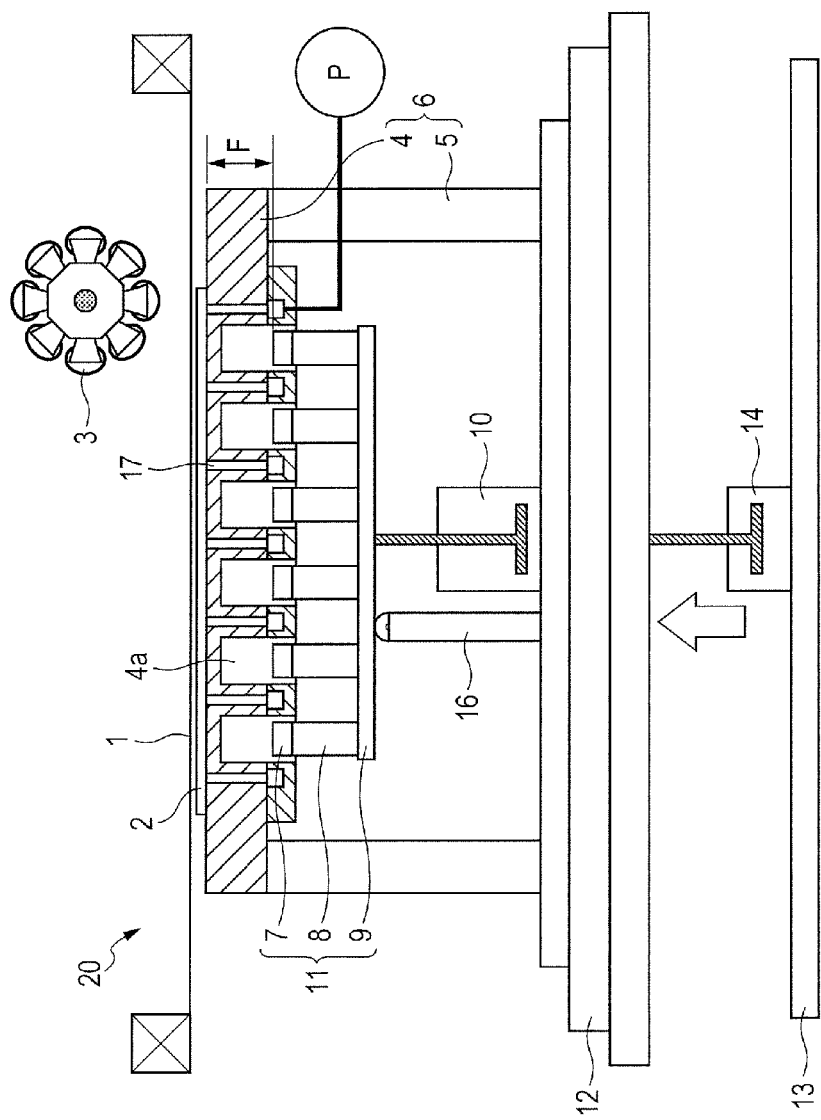
FIG. 2 is a front view for explaining an operational state of a mask absorption portion of the solder ball printing apparatus shown in FIG. 1.
Figure 3:
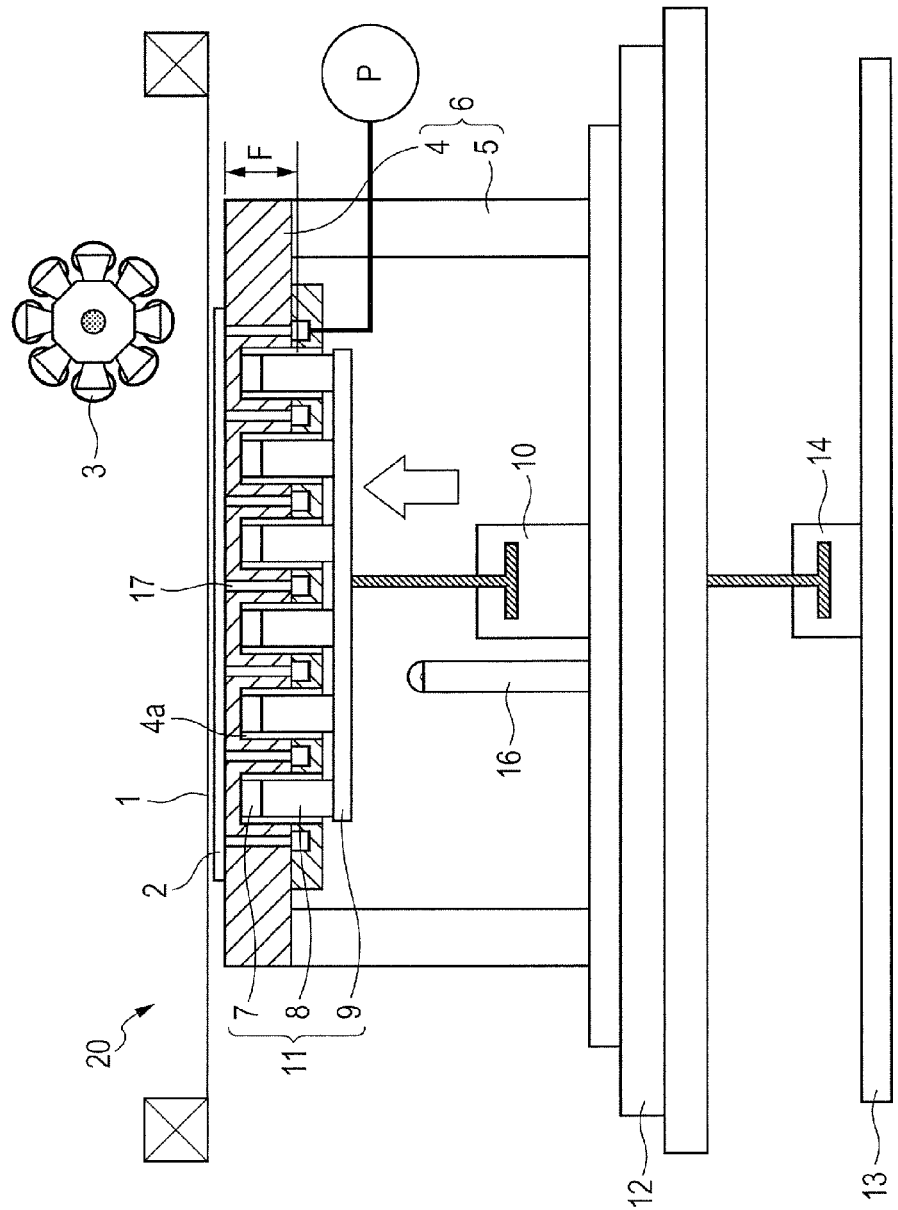
FIG. 3 is a front view for explaining an operational state of the mask absorption portion of the solder ball printing apparatus shown in FIG. 1.
Figure 4:
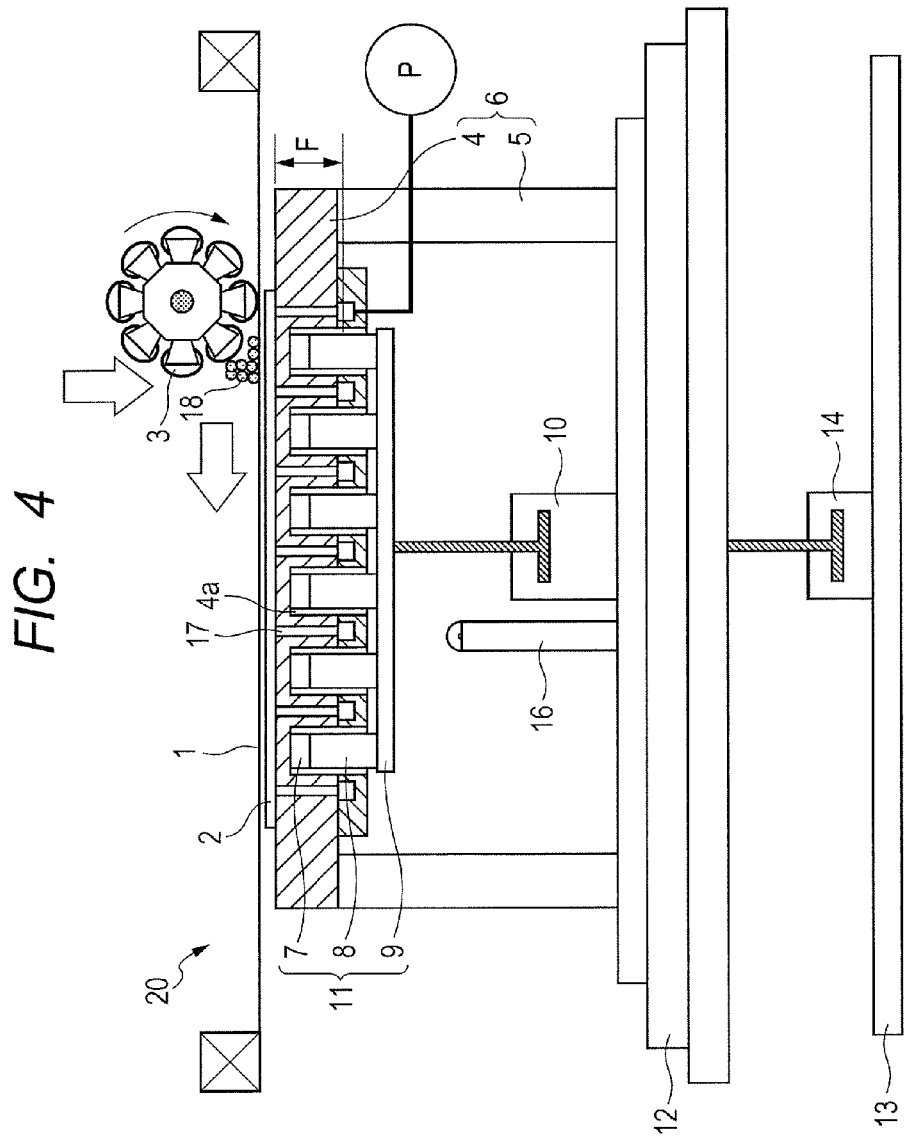
FIG. 4 is a front view for explaining a printing operational state of the solder ball printing apparatus shown in FIG. 1.

An embodiment of a solder ball printing apparatus 20 according to the present invention will be described in detail using FIG. 1 to FIG. 7. FIG. 1 is a front part cross-sectional view of the embodiment of the solder ball printing apparatus 20 according to the present invention, and is a view for showing a state in which a substrate 2, to be described later in detail, is separated from a mask 1. FIG. 2 is a front part cross-sectional view of the solder ball printing apparatus 20 shown in FIG. 1, and is a view for showing a state in which the substrate 2 comes close to the mask 1. FIG. 3 is a front part cross-sectional view of the solder ball printing apparatus 20 shown in FIG. 1, and is a view for showing a state in which the substrate 2 attracts the mask 1 after the substrate 2 comes close to the mask 1. FIG. 4 is a front part cross-sectional view of the solder ball printing apparatus 20 shown in FIG. 1, and is a view for showing a state in which solder balls are printed after the mask 1 is attracted.

Figure 5:
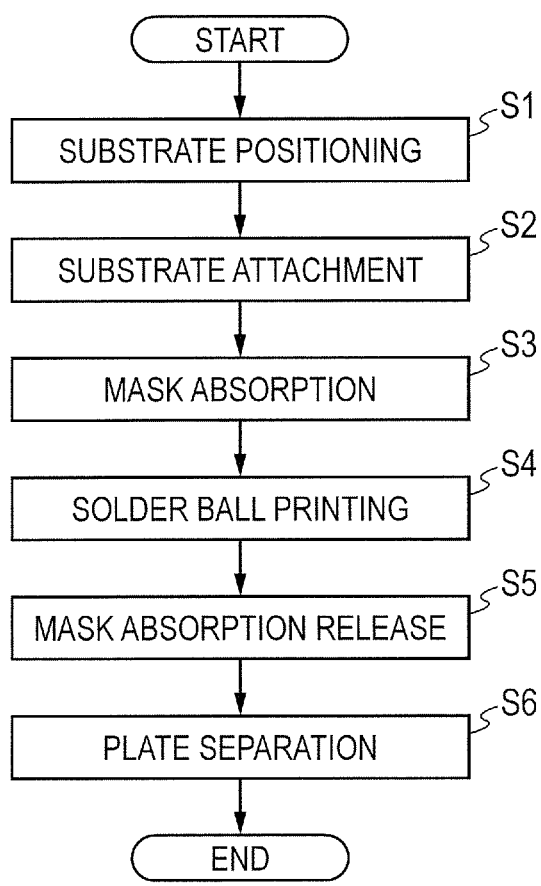
FIG. 5 is a flowchart for showing a printing method of solder balls.

FIG. 5 is a flowchart for showing a procedure of solder ball printing in the solder ball printing apparatus 20 according to the present invention, and FIG. 6 are diagrams each showing a state in which the mask portion is being processed when the solder balls are printed in accordance with the flowchart shown in FIG. 5. In addition, FIG. 7 are diagrams associated with to FIG. 6, and are diagrams each explaining a conventional printing method.

In the solder ball printing apparatus 20, a substrate mounting table 6 is fixed and mounted on a print table 12. The print table 12 includes a print table cylinder 14 that allows an upper surface member forming an upper surface of the print table 12 to be moved in the vertical direction and that is driven by air pressure, and an XYθ stage 13 that allows the print table 12 to be moved in the X and Y directions that are two directions on a horizontal plane and in the θ direction that is a rotational direction in a horizontal plane.

The substrate mounting table 6 mounted on the print table 12 includes a substrate reception plate 4 extending in the horizontal direction, and plural substrate reception plate supporting members 5 that support the substrate reception plate 4 in the vertical direction. The print table 12 further includes a mask absorption portion 11 having portions fitted into plural hole portions 4*a* formed in the substrate reception plate 4.

As will be described later (see FIG. 8), the mask absorption portion 11 has magnets 7 disposed on the upper end side and has magnetic pins 8 attached on the lower side of the magnets 7. Each of the bottom surfaces of plural combined parts of the magnets 7 and the magnetic pins 8 each formed in a column shape is attached to a magnetic plate 9, which is a rectangular plate, by absorption. The magnetic plate 9 is allowed to be moved up and down, so that the plural combined parts of the magnets 7 and the magnetic pins 8 are moved up and down together, and each combined part is fitted into the hole portion 4*a* formed in the substrate reception plate 4. In this case, as the material of the magnets 7, permanent magnets such as neodymium, ferrite magnets, samarium-cobalt magnets, or alnico magnets can be used, and the material of the magnets is not particularly limited.

A mask absorption portion cylinder 10 driven by air pressure is connected to the bottom surface of the magnetic plate 9 configuring a lower part of the mask absorption portion 11. The mask absorption portion cylinder 10 is fixed and mounted on the print table 12, and allows the mask absorption portion 11 to be moved up and down. It is obvious that the mask absorption portion 11 can be moved up and down relative to the fixed substrate mounting table 6. It should be noted that a mask absorption portion lower-end stopper 16 is attached to the upper surface of a base plate configuring a lower part of the substrate mounting table 6 to restrict a descent of the mask absorption portion 11, and the combined parts of the mask absorption portion 11 are prevented from getting out of the hole portions 4*a*.

Plural pores that are opened on the upper surface side and that extend in the vertical direction are formed in the substrate reception plate 4 of the substrate mounting table 6, and flow channels connecting the plural pores to each other in the horizontal direction are formed. The pores and flow channels form vacuum suction flow channels 17. The vacuum suction flow channels 17 are in communication with a vacuum suction pump P. When the vacuum pump P is operated, opening portions at tip ends of the vacuum suction flow channels 17 become a negative pressure, and the substrate 2 is sucked to the upper surface of the substrate reception plate 4 in vacuum. Accordingly, the substrate 2 is fixed to the substrate reception plate 4.

An operation of the solder ball printing apparatus thus configured will be described below using the flowchart shown in FIG. 5 and the front view of the solder ball printing apparatus of each of FIG. 1 to FIG. 4. FIG. 1 is a diagram for showing a state at the time of a substrate positioning operation in Step S1 of FIG. 5, and is a diagram for showing a state in which the substrate 2 is mounted on the substrate mounting table 6 by carrier means (not shown). FIG. 1 shows a state (descent state) in which the print table cylinder 14 that moves the print table 12 up and down is contracted up to the lowermost position and the magnetic plate of the mask absorption portion 11 abuts on the mask absorption portion lower-end stopper 16 before starting to print the solder balls. The print table cylinder 14 is in a descent state, and thus the substrate mounting table 6 has descended up to the lowermost end of the movable range. Since the substrate mounting table 6 is in a descent state, the substrate 2 mounted on the substrate mounting table 6 descends, and the mask 1 and the substrate 2 are separated from each other. However, the mask 1 is located on the upper side not so far away from the substrate 2.

In the state shown in FIG. 1, a camera (not shown) is allowed to be moved between the mask 1 and the substrate 2, and positioning marks preliminarily formed on the mask 1 and the substrate 2 are imaged. Specifically, the mark formed on the lower surface of the mask 1 is imaged in the upward view of the camera, and the installed posture of the mask 1 is recognized as a target position. The mark formed on the substrate 2 is imaged in the downward view of the camera. Then, a control device (not shown) issues a command of a correction operation to the XYθ stage 13 to correct a positional shift between the position of the mark of the mask 1 and the position of the mark of the substrate 2, so that the position of the mark of the substrate 2 is adjusted to that of the mark of the mask 1. It should be noted that the camera and the marks are not illustrated in this case.

Incidentally, the state shown in FIG. 1 is a descent state in which the mask absorption portion cylinder 10 is also contracted up to the lowermost position. Since the mask absorption portion cylinder 10 is in a descent state, the mask absorption portion 11 connected to the tip end of the mask absorption portion cylinder 10 is moved together to be in a descent state. In this state, the magnets 7 and the mask 1 are largely separated from each other, and an absorption force with which the magnets 7 absorb the mask 1 is extremely small. Thus, there is no possibility that the mask 1 is bent downward by the magnets 7.

FIG. 2 shows a state in which the print table cylinder 14 is stretched from the state shown in FIG. 1 to lift the print table 12. FIG. 2 shows a state at the time of a substrate attachment operation shown in Step S2 of FIG. 5. The print table cylinder 14 is stretched as shown by the arrow and the print table 12 is lifted. Thus, a gap between the upper surface of the substrate 2 and the lower surface of the mask 1 becomes small, and the upper surface of the substrate 2 and the lower surface of the mask 1 finally come into contact with each other.

It should be noted that plural protrusion-like minute posts 15 (see FIG. 6) each smaller than the diameter of the solder ball are provided on the lower surface of the mask 1, and thus the mask 1 and the substrate 2 come into contact with each other at the points of the plural posts 15. As a result, the mask 1 and the substrate 2 are apart from each other by the height of the posts 15 except the posts 15 to be controlled to have a predetermined minute gap. In addition, during the transition from Step S1 to Step S2, the print table cylinder 14 is continued to be stretched. In this state, a distance F between the upper surface of the magnets 7 and the upper surface of the substrate mounting table 6 is kept. Specifically, the distance between the mask 1 and the magnets 7 is kept, and an absorption force acting on the mask 1 is extremely small. Thus, there is no possibility that the mask 1 is bent on the lower side that is the side of the magnet 7.

Further, FIG. 3 shows a state in which the mask absorption portion cylinder 10 is allowed to be stretched so that the combined parts of the magnets 7 and the magnetic pins 8 of the mask absorption portion 11 are fitted into the hole portions 4a formed in the substrate reception plate 4 to proceed the solder ball printing process. FIG. 3 is a diagram for showing a state of the solder ball printing apparatus 20 at the time of a mask absorption process in Step S3 of FIG. 5.

When the mask absorption portion cylinder 10 is stretched as shown by the arrow, the mask absorption portion 11 is lifted. In this case, the magnets 7 provided at the tip ends of the plural combined parts of the magnets 7 and the magnetic pins 8 formed in a column shape immediately shorten the distance to the mask 1, and the mask 1 finally adheres tightly to the substrate 2 through the posts 15. In this case, the gap between the mask 1 and the substrate 2 that adhere tightly to each other through the posts 15 corresponds to the height of the posts 15, and flux that is preliminarily applied on the upper surface of the substrate 2 is prevented from adhering to the lower surface of the mask 1. Accordingly, when the mask 1 is attracted by the magnetic force of the magnets 7, the mask 1 is not bent because the posts 15 of the mask 1 already come into contact with the substrate 2. When the mask absorption portion cylinder 10 is completely stretched and the magnets 7 are lifted up to the upper end, the state is maintained to reliably allow the mask 1 and the substrate 2 to adhere tightly to each other.

As described above, in the embodiment, the operation of moving the substrate 2 closer to the mask 1 using the print table cylinder 14 is executed separately from the operation of attracting the mask 1 to the substrate 2 with the magnets 7 after the mask absorption portion 11 having the magnets 7 is lifted to come close to the substrate 2. Therefore, the mask 1 and the substrate 2 are allowed to come into contact with each other to be attracted and fixed without bending the mask 1. Further, the flatness of the substrate 2 can be maintained in a processing state of the solder ball printing apparatus 20.

The substrate 2 is positioned and fixed in a solder ball printable state, and then the flow is moved to a solder ball printing process shown in Step S4 of FIG. 5. FIG. 4 is a front view of the solder ball printing apparatus 20 showing a solder ball printing state. In FIG. 4, a pad (electrode portion) 19 of the substrate 2 is filled with solder balls 18 from plural opening portions 1a that are preliminarily formed in the mask 1 in accordance with a pattern.

A vertically-driving mechanism of a head (not shown) is driven to move a squeegee (feeding head) 3 downward up to a predetermined position above the mask 1, and the squeegee 3 is allowed to come into contact with the upper surface of the mask 1 with a predetermined pressing force. The width of the squeegee 3 is approximately equal to the width direction of the substrate 2 or larger than the width of the substrate 2. Therefore, if the squeegee 3 is moved one way or reciprocated in the horizontal direction (direction in parallel with the upper surface of the substrate 2), the opening portions 1a of the mask 1 are usually filled with the solder balls 18. However, in order to reliably fill the opening portions 1a of the mask 1 with the solder balls 18, it is preferable to reciprocate the squeegee 3 twice or more to fill the opening portions 1a of the mask 1. When the squeegee 3 is moved in the horizontal direction, the squeegee 3 is rotated by driving a rotary driving mechanism (not shown) provided in the squeegee 3. The squeegee 3 is rotated at a relatively low speed of 5 revolutions per second or slower.

Figure 6A:
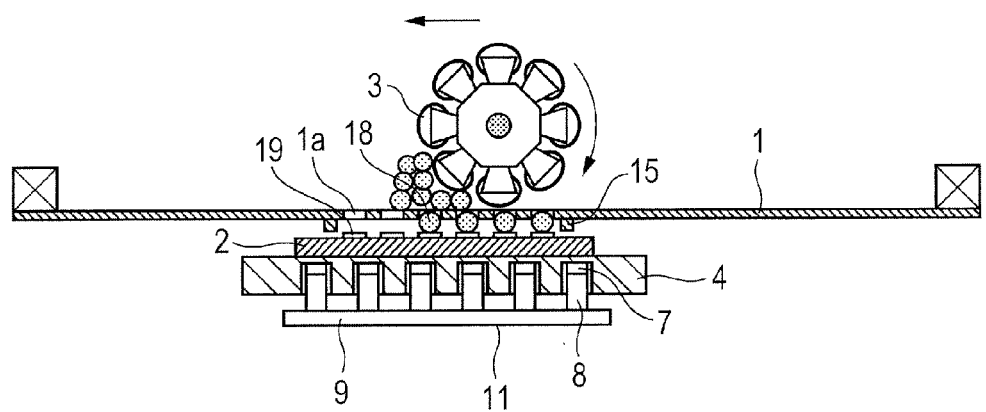
FIGS. 6A and 6B are diagrams each explaining a printing operation of the solder ball printing apparatus according to the present invention.

The detail of a process following the filling process of the solder balls 18 in the solder ball printing will be described using the detailed diagram of the mask 1 shown in each of FIGS. 6A and 6B. FIG. 6A is a diagram in which the squeegee 3 is being moved one way in the horizontal direction (from the right to the left direction in the drawing) while being rotated rightward. The solder balls 18 pass through the opening portions 1a of the mask 1 so as to fill the pad (electrode portion) 19 on which flux of the substrate 2 is applied.

Figure 6B:
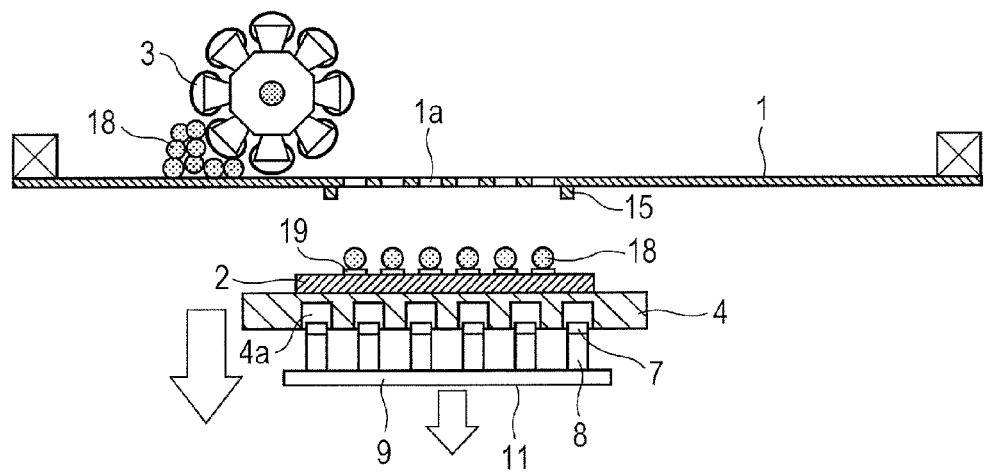

FIG. 6B is a diagram for showing a state after the filling work of the solder balls 18 by the squeegee 3 is completed. FIG. 6B is a diagram for showing a state in which a mask absorption release process shown in Step S5 of FIG. 5 and a plate separation process shown in Step S6 in which the substrate 2 is separated from the mask 1 are being executed.

In order to execute the process of Step S5, the mask absorption portion cylinder 10 that is not illustrated in FIG. 6B is allowed to be contracted to move the mask absorption portion 11 downward as shown by the small arrow of the drawing. As the mask absorption portion 11 is moved downward, the magnets 7 disposed at the tip ends of the combined parts of the magnets 7 and the magnetic pins 8 of the mask absorption portion 11 increases the distance to the mask 1. If the distance between the magnets 7 and the mask 1 is continued to be increased, the absorption force of the magnets 7 is gradually released. However, the mask 1 remains adhering tightly to the substrate 2 through the posts 15, and thus the mask 1 is not bent.

Next, in order to execute the process of Step S6 of FIG. 5, the print table cylinder 14 that is not illustrated in FIG. 6B is allowed to be contracted to move the print table 12 downward as shown by the large arrow of the drawing. Accordingly, the distance between the upper surface of the substrate 2 and the lower surface of the mask 1 is sufficiently increased, and the mask 1 is separated from the substrate 2.

According to the embodiment as described above, during a series of operations for printing the solder balls in Steps S1 to S6, the operation of moving the mask absorption portion 11 downward can be executed independently from the operation of moving the substrate mounting table 6 downward. In this case, the mask 1 can be separated from the top surface of the substrate mounting table 6 in a state where the magnets 7 are apart from the mask 1. In this state, the mask 1 is separated from the substrate 2, and no attraction force of the magnets 7 extends over the mask 1. In addition, even if the substrate mounting table 6 is allowed to descend, there is no possibility that the mask 1 is bent.

Figure 7A:
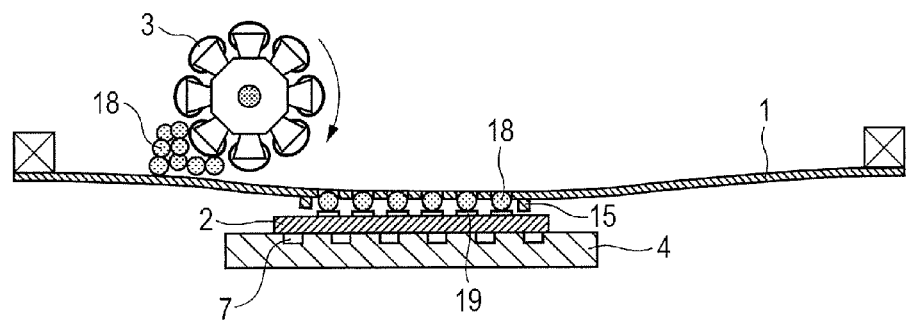
FIGS. 7A and 7B are diagrams each explaining a printing operation of a conventional solder ball printing apparatus.
Figure 7B:
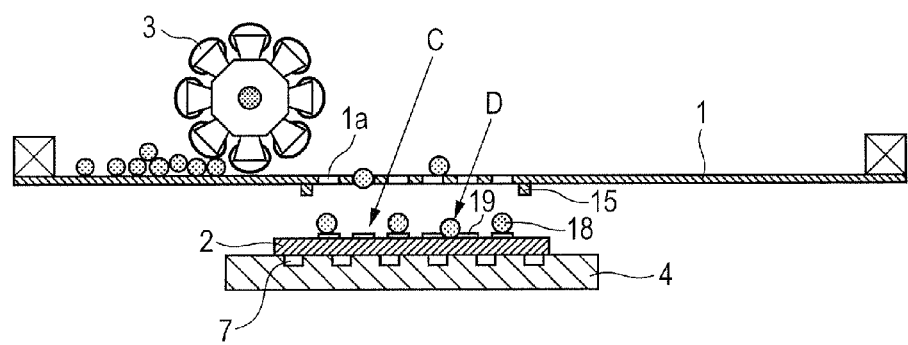

For the purpose of reference, a conventional process in which the magnets 7 are embedded and combined into a substrate reception plate 7 and the substrate 2 is separated from the mask 1 is shown in each of FIGS. 7A and 7B. FIGS. 7A and 7B are diagrams associated with FIG. 6. FIG. 7A shows a state in which the pad (electrode portion) 19 of the substrate 2 on which flux is applied is filled with the solder balls 18 while the solder balls 18 pass through the opening portions 1a of the mask 1 in the printing process.

In this case, even if trying to separate the substrate 2 from the mask 1, the mask 1 is started to be bent in the course in which the substrate 2 is gradually separated from the mask 1 because the attraction force of the magnets 7 acts on the mask 1 due to the fixed distance between the magnets 7 and the posts 15 formed on the back surface of the mask 1. The size of the opening portions 1a of the mask 1 is slightly larger than the outer diameter of the solder balls 18 in order to improve the positioning accuracy, and thus the opening portions 1a of the mask 1 frequently come into contact with the solder balls 18.

Further, when the substrate 2 is separated from the mask 1, the tension of the mask 1 exceeds the attraction force of the magnets 7, and the bending is released as shown in FIG. 7B. In this case, the mask 1 moves the solder balls 18 on the substrate 2 coming into contact with the opening portions 1a, and the solder balls 18 are moved from the pad 19 on the substrate 2 to cause a positional shift. Alternatively, the solder balls 18 are moved together with the mask 1 and disappear from the substrate 2 (the states of C and D in the drawing). These cause deterioration in the quality of the substrate 2. Further, when the bending of the mask 1 is released, the mask 1 vibrates. The vibration causes the remaining solder balls 18 on the mask 1 to be moved and dispersed from predetermined holding positions for the solder balls 18, and causes adverse effects such as that the solder balls cannot be effectively used at the time of the next printing operation.

On the contrary, in the solder ball printing apparatus described in the embodiment, the operation of moving the mask 1 and the substrate 2 closer to each other is separated from the operation of applying the attraction force of the magnets 7 to the mask 1 by lifting the mask absorption portion 11 closer to the mask 1. Therefore, the operation of moving the mask 1 and the substrate 2 closer to each other and the operation (plate separation) of separating the mask 1 and the substrate 2 from each other can be executed in a state where no attraction force of the magnets 7 is applied to the mask 1.

Next, some embodiments of the mask absorption portion 11 provided in the solder ball printing apparatus 20 shown in FIG. 1 will be described using FIG. 8 and FIG. 9. FIG. 8 is a perspective view of one embodiment of the mask absorption portion 11, and is a detailed diagram of a part A of FIG. 1. The mask absorption portion 11 is formed in such a manner that plural magnets 7 and magnetic pins 8 are disposed on the magnetic plate 9 so that the magnets 7 can apply a uniform and large attraction force in a wide range on the back surface side of the substrate 2.

Specifically, the column-shaped magnet 7 and the magnetic pin 8 are combined with each other by simply mounting the magnet 7 on the magnetic pin 8 whose outer diameter is substantially the same as that of the magnet 7 and whose length in the axial direction is longer than that of the magnet 7, and plural column-shaped combined parts are simply mounted on the rectangular magnetic plate 9. Therefore, plural column-shaped combined parts of the erect magnets 7 and magnetic pins 8 can be fixed to the magnetic plate 9 for use without using fastening members such as screws in the embodiment. This is because a magnetic force can be transmitted only by bringing the magnets 7, the magnetic pins 8, and the magnetic plate 9 into contact with each other due to the magnetic property of both the magnetic pins 8 and the magnetic plate 9, and the adhering state is utilized.

In the limit (descent state) of contracting the mask absorption portion cylinder 10 when the mask absorption portion 11 is allowed to be moved up and down using the mask absorption portion cylinder 10, the bottom surface of the mask absorption portion 11 comes into contact with the mask absorption portion lower-end stopper 16 fixed to the substrate mounting table 6, and the contraction of the mask absorption portion cylinder 10 is stopped.

According to the embodiment, even when the mask absorption portion 11 is in a descent state, the upper-end surface of each magnet 7 is located above the lower surface of the substrate reception plate 4. Thus, the magnetic pins 8 and the magnets 7 do not fall off from the substrate reception plate 4. Further, the magnets 7, the magnetic pins 8, and the magnetic plate 9 are absorbed to each other using the magnetic force generated by the magnets 7, and no screws are needed. Thus, screwing and unscrewing work of plural screws can be omitted at the time of maintenance work. Further, the thickness of the substrate reception plate 4 indicated by the dimension "E" in FIG. 1 can be increased to as thick as 20 mm or larger. As a result, although a conventional substrate reception plate is poor in stiffness at the time of production and is difficult to be processed due to a small thickness, a substrate reception plate having a flatness of 30 μm or smaller suitable for minute solder balls can be easily produced.

Figure 9:
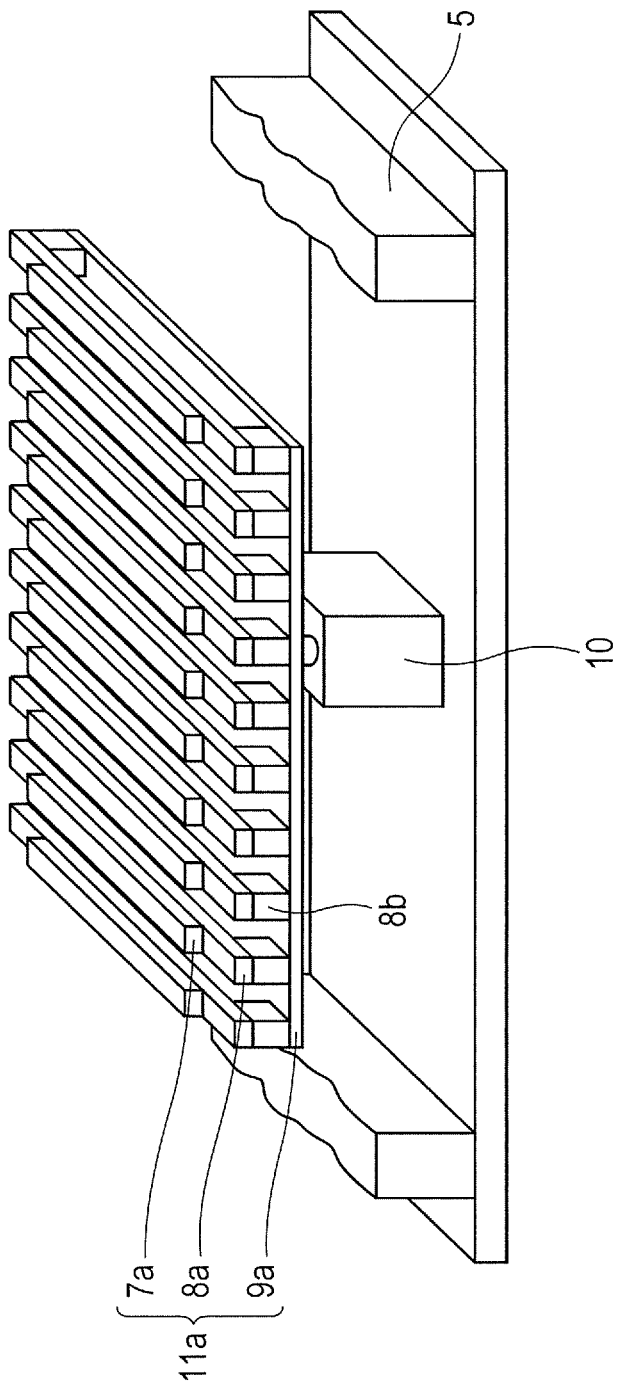
FIG. 9 is a perspective view of another embodiment of the mask absorption portion.

Next, FIG. 9 is a perspective view of another embodiment of a mask absorption portion 11a used in the solder ball printing apparatus 20 shown in FIG. 1. The mask absorption portion 11a shown in FIG. 9 is different from the mask absorption portion 11 described in each of the above-described embodiments in that prismatic magnets 7a extending in the horizontal direction and bars 8a extending in the horizontal direction mounted on the magnets 7a are used instead of the column-shaped pins 8 and the column-shaped magnets 7. Therefore, the hole portions 4a formed on the back surface side of the substrate mounting plate 4 of the substrate mounting table 6 are formed like plural grooves arranged in parallel with each other.

The number of magnetic pins is further reduced and the magnetic force is uniformed. The longitudinal direction of the prismatic magnetic bars 8a is set along the width direction of the substrate 2, and plural magnetic bars 8a are arranged by the length of the substrate 2 or to cove the range of the length or longer in the length direction (direction orthogonal to the width direction) of the substrate 2. The both ends of the magnetic bars 8a in the longitudinal direction are supported by magnetic pillars 8b fixed to a support plate 9 through screws or the like. At the end of contraction (descent state) of the mask absorption portion cylinder 10, the bottom surface of the mask absorption portion 11a is allowed to abut on the mask absorption portion lower-end stopper 16 to stop the contraction of the mask absorption portion cylinder 10 as similar to the above-described embodiments.

In the embodiment, it is only necessary for the magnets 7a to apply the absorption force only to the magnetic bars 8a except the mask 1. It is not necessary to apply the absorption force to the support plate 9a. Further, since the magnets 7a are extended longer, and irregularities of the magnetic force between the magnets 7a and 7a can be reduced.

As described above, according to each embodiment of the present invention, the moving operation of the substrate relative to the mask can be performed separately from the absorption operation by the magnets between the mask and the substrate. Thus, the operation of moving the mask 1 and the substrate 2 closer to each other and the operation (plate separation) of separating the mask 1 and the substrate 2 from each other can be executed in a state where no attraction force is applied to the mask 1. As a result, the solder balls 18 can be mounted and the plate separation can be performed while keeping the flatness of the substrate 2 without deforming the mask 1 in the printing process or a process before or after the printing process by the solder ball printing apparatus. In addition, the solder balls 18 can be stably mounted on the substrate 2.

What is claimed is:

1. A solder ball printing apparatus that fills plural openings formed in a mask with solder balls using a squeegee and mounts the solder balls on plural electrode portions formed on a surface of a substrate facing the mask, the machine comprising:
 a substrate mounting table on which the substrate is mounted and on the back surface side of which plural hole portions are formed;
 an XYθ stage which can drive a table on which the substrate mounting table is mounted in a horizontal plane;
 first vertically-driving means that can vertically drive the table on which the substrate mounting table is mounted;
 a mask absorption portion which has members including permanent magnets fitted into the plural hole portions formed in the back surface of the substrate mounting table; and
 second vertically-driving means which can vertically drive the mask absorption portion and is provided under the substrate mounting table,
 wherein the first vertically-driving means and the second vertically-driving means can be driven independently from each other.

2. The solder ball printing apparatus according to claim 1, wherein the members that are provided in the mask absorption portion and can be fitted into the plural hole portions of the substrate mounting table have plural column-like objects obtained by combining column-like permanent magnets extending in the vertical direction with column-like magnetic members that are adsorbed to the column-like permanent magnets and extend in the vertical direction, and a plate to which the plural column-like objects are absorbed.

3. The solder ball printing apparatus according to claim 1, wherein the members that are provided in the mask absorption portion and can be fitted into the plural hole portions of the substrate mounting table have bar-like permanent magnets extending in the lateral direction and magnetic bars that are disposed on the back surface side of the permanent magnets and are absorbed to the permanent magnets, and the plural hole portions formed in the substrate mounting table are substantially-parallel plural grooves.

4. The solder ball printing apparatus according to claim 1, wherein the members that are provided in the mask absorption portion and can be fitted into the plural hole portions of the substrate mounting table have permanent magnets located on the substrate side and magnetic members located on the side opposite to the substrate, and are installed to hold the positions of the magnets and the magnetic members using only absorption by the magnetic force of the permanent magnets.

5. The solder ball printing apparatus according to claim 1, wherein the second vertically-driving means that drives the mask absorption portion that can be driven independently from the vertical movement of a substrate print table allows the members that are provided in the mask absorption portion and can be fitted into the plural hole portions to be fitted into the hole portions formed in the back surface of the substrate mounting table at the uppermost ascent position of the mask absorption portion, and a mask absorption portion lower-end stopper is provided to prevent the members that can be fitted into the plural hole portions from getting out of the hole portions of the substrate mounting table at the lowermost descent position of the mask absorption portion.

6. A solder ball printing method in which plural openings formed in a mask are filled with solder balls using a squeegee and the solder balls are mounted on plural electrode portions formed on a surface of a substrate facing the mask, wherein a substrate mounting table on which the substrate is mounted is lifted using first vertically-driving means that drives the substrate mounting table; the substrate and the mask are positioned using an XYθ table; combined members of permanent magnets and magnetic bodies that are fitted into hole portions formed on the back surface side of the substrate mounting table and are provided in a mask absorption portion are lifted using second vertically-driving means in the hole portions; and the mask and the substrate are absorbed by the permanent magnets.

* * * * *